2,567,168

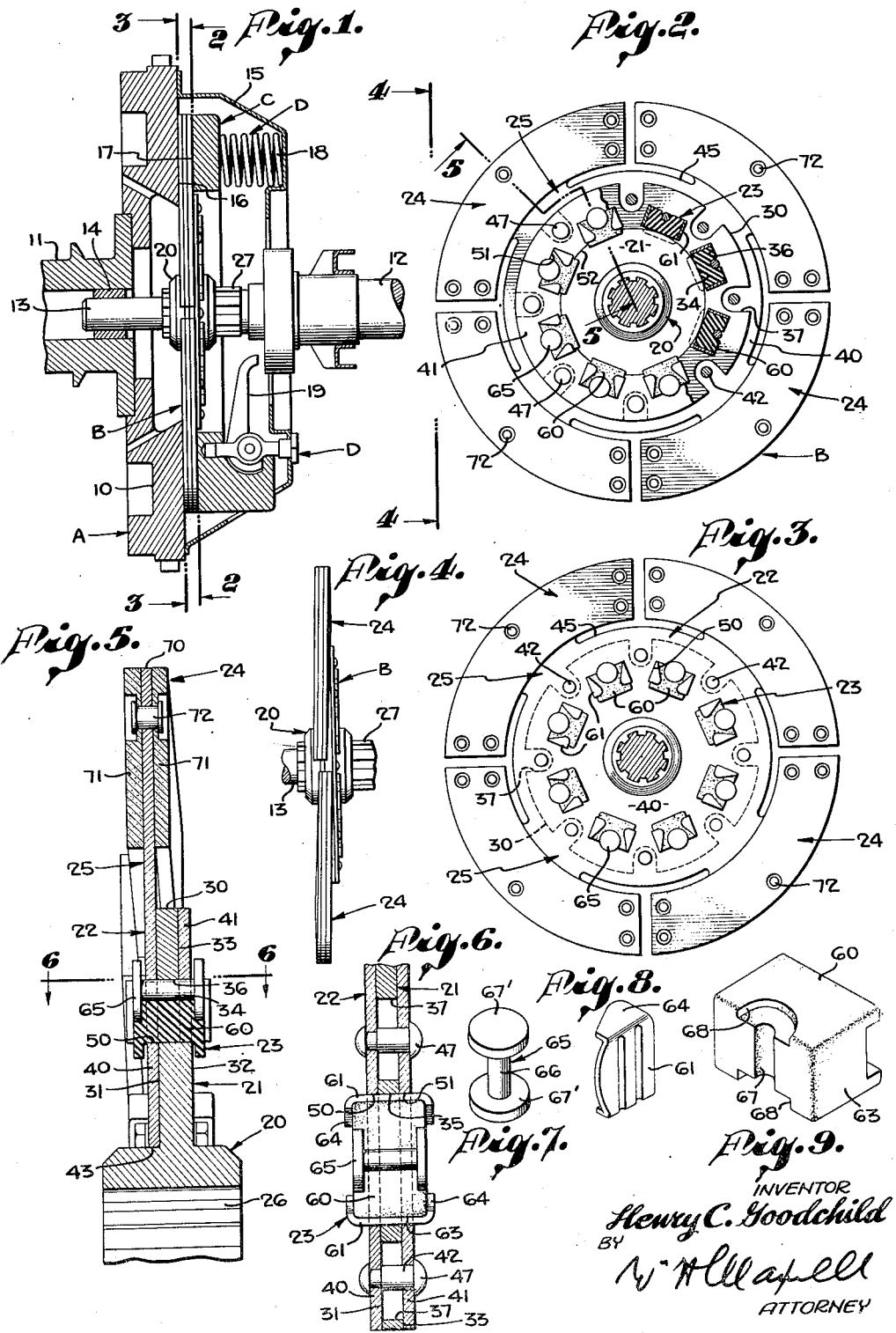
Sept. 11, 1951     H. C. GOODCHILD     2,567,168
RUBBER BLOCK FOR PLATE TYPE CLUTCHES
Filed Nov. 14, 1947
INVENTOR
Henry C. Goodchild
ATTORNEY Patented Sept. 11, 1951

UNITED STATES PATENT OFFICE 2,567,168

RUBBER BLOCK FOR PLATE TYPE CLUTCHES

Henry C. Goodchild, Los Angeles, Calif.

Application November 14, 1947, Serial No. 785,975

6 Claims. (Cl. 267—63)

This invention relates to a plate type clutch and it is a general object of the invention to provide a clutch of simple, effective and inexpensive construction which has a soft or cushioned action.

The clutch of the present invention may be used, generally, where it is desired to transmit power as for instance from one revolving member to another. Since the construction of the present invention is particularly suited for use in motor vehicles and the like where it may be employed in effecting drive from the engine to the propeller shaft, I have elected to illustrate a form of adaptation of the present invention particularly suitable for this particular class of use. However, I wish it understood that such reference is not to be taken as limiting or restricting the invention in any way.

Clutches have long been used where it is desired to transmit power or force from one rotatable member to another and they are a well recognized element of motor vehicles where they are employed to couple the prime mover or engine with the propeller shaft which, in turn, drives the wheels, usually the rear wheels. In this particular field various forms of clutches have been employed. However, it has been found that plate type clutches are most generally satisfactory, although their action is not always as smooth and soft as is desired. Attempts have been made to overcome the disadvantages experienced with plate-type clutches but as far as I am aware it has heretofore been found that the ordinary or simple flat plate construction is about as satisfactory as are more elaborate constructions that have been proposed.

It is a general object of my present invention to provide a plate type clutch of simple, inexpensive manufacture, in fact, of manufacture comparable to ordinary clutches of this character, but which is such as to establish progressive frictional engagement between the joined parts whereby the engagement of the clutch is smooth and without grabbing or jerking action. With the construction of the present invention the gripping surface or surfaces included in the clutch are increased in extent as the clutch is engaged from a minimum when the clutch is first engaged, to a maximum when the clutch is fully engaged, as distinguished from the usual clutch engagement where the entire clutch surface or surfaces are engaged from the time the clutching action is initiated until it is completed.

Another object of the present invention is to provide a clutch of the general character referred to wherein the gripping action is gained through the use of a plurality of individual shoes which are such as to individually couple the parts to be connected and are so arranged and related as to provide a smooth, balanced clutch action.

It is another object of the present invention to provide a clutch of the general character referred to including resilient shoes or resiliently mounted shoes deflected from an angular position relative to the gripping faces of the connected parts in the course of being brought into full gripping engagement with the connected parts, to the end that the pressure engagement of the shoes with the connected parts gradually increases until final full clutching engagement is established.

A further object of the present invention is to provide a clutch of the general character referred to including friction shoes supported through a cushion mounting so that the gradual or cushioned engagement of the shoes themselves is supplemented by the action of the structure through which the shoes are supported.

The various objects and features of my invention will be fully understood from the following detailed description of a typical preferred form and application of the invention, throughout which description reference is made to the accompanying drawings, in which:

Fig. 1 is a sectional view of a clutch between an engine and a propeller shaft, which clutch involves the construction provided by the present invention. Fig. 2 is a face or front view of the frictional element of the clutch showing certain portions thereof broken away to illustrate details of construction, and being a view taken in the direction indicated by line 2—2 on Fig. 1. Fig. 3 is a view of the other side of the frictional element taken in the direction indicated by line 3—3 on Fig. 1. Fig. 4 is a view taken as indicated by line 4—4 on Fig. 2. Fig. 5 is an enlarged detailed sectional view taken as indicated by line 5—5 on Fig. 2. Fig. 6 is a detailed sectional view of a portion of the frictional element taken as indicated by line 6—6 on Fig. 5. Fig. 7 is a perspective view of a retainer employed in the cushioning means incorporated in the construction. Fig. 8 is a perspective view of one of the bearing members employed in the cushioning means, and Fig. 9 is a perspective view of one of the cushions employed in the present invention.

The plate type clutch that I have illustrated in the drawings, being of the type commonly employed in motor vehicles, is shown as including a drive element A, a friction element B, a pressure element C, and operating means D for the pressure element. In the case illustrated the drive element A is shown as the fly-wheel 10 of an engine and is fixed on the end of an engine shaft 11. The friction element B is shown carried by or having driving engagement with a propeller shaft 12 which shaft has a forward extension 13 mounted in a bearing 14 in the end of the engine shaft 11. The pressure element C is shown as an annular part or clamp plate carried by the fly-wheel 10 through a suitable cage 15 and cooperates with the fly-wheel in gripping the friction element B.

In accordance with conventional construction the fly-wheel is shown with a flat finished face 16 to be engaged by the frictional element and the pressure element C is shown provided with a flat finished face 17 that opposes the face 16, the frictional element being arranged between the faces 16 and 17. The operating means D actuates the pressure element toward and away from the fly-wheel to grip or release the frictional element as desired. In the particular case illustrated the means D involves a plurality of springs 18 supported by the cage 15 and normally yieldingly urging the pressure element toward the fly-wheel so that the frictional element is normally gripped between the pressure element and fly-wheel. The operating means further includes one or more elements of a releasing mechanism 19 operable to shift the pressure element away from the fly-wheel against the resistance of the springs 18. It is to be understood that the elements and action of means D may be that common to clutches employed in motor vehicles.

The frictional element B of the clutch includes features of construction provided by the present invention and this element of the mechanism may be considered as including, generally, a hub 20, a flange 21 projecting radially from the hub, a ring or annular element 22 coupled to the flange 21 by cushioning means 23, and friction shoes 24 carried by the ring 22 through necks 25.

The hub 20 is applicable to or is mounted on the propeller shaft 12 which is the driven element of the construction, while the flange 21 is preferably fixed or rigidly joined to the hub to project radially therefrom. The ring 22 may be a simple one-piece construction or it may be a fabricated structure as I will hereinafter describe, and it is supported on the flange through the cushioning means 23. The cushioning means 23 involves a plurality of circumferentially spaced units which are alike and which resiliently couple the ring 22 with the flange 21 in a manner to allow limited cushioned rotation of the ring relative to the flange. The shoes 24 are friction elements that engage and cooperate with the faces 16 and 17 of the elements A and C, respectively, and are preferably arcuate segmental members of equal size and shape and symmetrically arranged about the center of the structure. The necks 25 are preferably such that there is but one neck for each shoe 24 and the necks support the shoes from the flange 21 through the ring 22 in the manner hereinafter described.

The hub 20 is a sleeve-like part surrounding the propeller shaft 12 and is preferably keyed or splined thereto to establish the desired driving engagement between the hub and the shaft. In the particular case illustrated it is desirable that the element B should be free to shift bodily in an axial direction relative to the other parts, and therefore, I have shown the hub 20 mounted on the shaft 12 through a spline construction allowing free axial shifting of the hub on the shaft while maintaining positive driving engagement between these parts. In the construction illustrated teeth 26 are provided in the hub to mesh with teeth 27 on the shaft 12.

The flange 21 is preferably a flat-sided or plate-like part projecting radially from the hub and having its periphery 30 curved concentric with the axis of the hub. It is desirable that the flange 21 be rigid with the hub 20 and it may be formed integrally therewith, as shown in the drawings. The particular flange 21 illustrated in the drawings has a flat side 31 which is smooth and uninterrupted from the hub to the periphery 30. The other side 32 of the flange has a recess 33 in it extending inwardly from the periphery to accommodate a part of the ring 22.

Openings 34 are provided in or through the flange 21 to accommodate units of the cushioning means 23. In the particular case illustrated the openings 34 are substantially rectangular in shape or form and have parallel end edges 35 and parallel inner and outer edges 36. The flange 21 is further provided with openings to accommodate parts of the ring 22 and when the ring is in the form shown in the drawings the openings in the flange may be notches 37 entering the flange 21 from its periphery 30 and circumferentially spaced and proportioned to pass parts of the ring 22 with clearance, as will be hereinafter described.

The ring 22 may be a simple, annular element coupling the shoes to the flange 21, or it may, as I have shown in the drawings, be a structure involving or including a shoe plate 40, a secondary plate 41 and couplings 42 joining the plates and accommodated by the openings 37 in the flange 21. In the particular case illustrated the shoe plate 40 is a large annular element arranged at the side 31 of flange 21 and having a central opening 43 accommodating the hub 20. The peripheral portion of the plate 40 projects somewhat beyond or radially outward of the periphery of flange 21 and its periphery 45 may be curved concentric with the axis of the structure except where it is occupied by the necks 25. The secondary plate 41 of the ring 22 is arranged at the side 32 of the flange 21 where it is received in the recess 33 provided in side 32.

The couplings 42 that join or connect the plates 40 and 41 are such as to rigidly and firmly connect the plates so that they form a rigid force-transmitting structure that is annular in form and which embraces the peripheral portion of the flange 21. In the particular case illustrated the couplings are shown as posts extending between the plates 40 and 41, the posts being shown provided with heads 47 positively retaining the plates in the desired coupled relationship.

The plate 40 of the ring 22 is provided with a plurality of openings 50 corresponding in shape and location with the openings 34 in the flange 21. In like manner the plate 41 is provided with openings 51 registering with the openings 34. The openings 51 in the plate 41 are shown as notches entering the plate from its inner periphery 52. It will be apparent from the drawings that the openings 50 and 51 in the plates 40 and 41, respectively, correspond in size, shape and arrangement with the openings 34 in the flange 21, thus establishing openings through the assembly of the ring and flange suitable for accommodating units of the cushioning means 23.

The cushioning means 23 involves a plurality of like units or cushions accommodated in or carried by the openings through the assembly of the flange 21 and ring 22. Each unit of the means 23 preferably includes a body 60 of cushioning material occupying the registering openings in the flange and plates which bodies form drive keys between the ring 22 and the flange 21 through which driving forces are communicated. Each unit of means 23 preferably includes, in addition to the cushioning body 60, bearing plates 61 which cover or occupy the ends 63 of the body. In practice the body 60 is preferably formed of rubber or a rubber-like material which might be injured or cut by the end edges presented at the openings formed in the flange and plates, and therefore it is desirable to employ the bearing plates 61 which are metal parts bearing flat on the ends 63 of the body 60 and effectively distributing strains or pressures communicated between the parts, that is, between the ring and the flange. The plates 61 are shown confined in place on the body 60 of cushioning material by lips 64 which extend over opposite sides of the body. When I use the word "rubber" in referring to body 60 I mean to include any rubber, rubber-like, or rubber substitute material having the general characteristics that I have mentioned.

Each unit of means 23 further includes a retainer 65 which serves to prevent displacement of the body 60 and its bearing plates from position between the flange 21 and the ring 22. In the case illustrated the retainer 65 is a spool shaped element and involves a shank 66 that extends through the body 60 from one plate of the ring to the other. Heads or enlargements 67' are provided on the ends of the shank 66 to project from or beyond the body 60 to overlie the outer sides of the plates 40 and 41, thus providing positive means checking lateral or axial displacement of the body from operating position. In practice the body 60 may be a molded member, say for instance a molded body of rubber or the like, in which case it may be advantageously formed with an opening 67 to pass the shank 66 and with recesses 68 at its sides to accommodate the heads 67'.

The shoes 24 are arcuate or segmental members, preferably equal in size and shape, and are supported from the ring 22 through the necks 25 so that they form an annular assembly fitting between the faces 16 and 17 of elements A and C. In the particular case illustrated I show four shoes 24 in which case each shoe extends through an arc of slightly less than 90°.

Each shoe 24 preferably includes a flat plate-like body 70 faced to have the desired frictional action. It is preferred that the body 70 of the shoe be faced on each side with a friction facing 71 such as is commonly employed in clutches of the general character under consideration. It is to be understood that the bodies of frictional facing 71 may correspond in size and shape with the sides of the body 70 of the shoe and it will be understood that the facings may be secured on the body in any desired manner. In the drawings I have shown suitable rivet fasteners 72 securing the facings 71 on the body 70.

The necks 25 support the shoes 24 in the desired annular arrangement from the periphery of the ring 22. In the particular case illustrated there is a single neck 25 for each shoe 24 and the several necks connect the shoes with the outer peripheral portion of plate 40. In accordance with my invention the neck 25 for each shoe connects to the inner peripheral portion of the shoe body 70 intermediate its ends leaving the body with portions of considerable circumferential extent projecting in either direction from the neck. It is preferred that the neck be joined to the body midway between its ends in which case the shoe is balanced in either direction relative to the neck.

In accordance with my present invention the necks 25 are such as to normally support the shoes from the ring 22 and between the members A and C so that they are deflected somewhat from the planes of the faces 16 and 17 of members A and C. This angular positioning or deflection of the shoes 24 may be gained by providing a slight twist in each neck 25 to the end that the shoes are normally angularly related or inclined as clearly shown in Fig. 4 of the drawings. In accordance with the preferred form of my invention the plate 40 of ring 22 and the bodies 70 of the several shoes 24 and the several necks 25 are all formed of a single integral or continuous body of material and I prefer to employ sheet steel or the like, so that the unit involving these parts has suitable inherent resilience. A permanent set is established in the unit involving the said parts giving the shoes 24 the pitched or inclined relationship hereinabove described and illustrated in the drawings. In practice the pitch or inclination of the shoes is alike for the several shoes and is such that as the clutch is engaged the leading or forward end portion of each shoe contacts only the face 16 of member A which is moving forward or away from the said ends of the shoes, while the other or trailing ends of the shoes first engage only the face 17 of the member C.

In the operation of the device, as gripping engagement is established the frictional element B bearing the shoes 24 is picked up and moved in the direction of element A and in turn picks up and carries with it in the same direction the element C. As the pressure element C advances toward the element A the shoes are deflected from their inclined or pitched positions gradually increasing the frictional engagement between the parts until such time as the shoes are deflected into the planes of the surfaces 16 and 17, whereupon there is full frictional engagement between the shoes and the members A and C. Since the bodies 70 of the shoes are made of the same material as the necks 25 there may, in practice, be some bending or deflection of the shoes themselves as driving engagement is established, making it unnecessary that the necks take all of the required deflection.

It will be apparent that as the element B is set in motion through the clutching action above described, torque is communicated to the shaft 12 through the structure of element B, which includes the cushioning means 23. The cushioning means 23 as hereinabove described provides a shock absorbing construction between the ring 22 and the flange 21 that will soften or cushion the clutching action. By combining the deflected shoes 24 which have a gradual and consequently soft smooth clutching action, with the cushioned construction between the plate 22 and flange 21, these elements of the structure act in series or one through the other, so that the overall clutching action of the structure is exceptionally smooth and gradual and yet is positive and firm when the mechanism is fully set. By providing the cushioning means 23 any tendency for the shoes to chatter or grab is dampened, if not completely eliminated, with the result that the mechanism that I have provided is such that it can be operated quickly, easily, and smoothly and without the exercise of particular case or great skill.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. A clutch cushion of the character described including, a body of rubber in the form of a block with a flat side, and a retaining spool carried by the body having a shank engaging the said side of the body and heads on the ends of the shank projecting from the body at said side and partially contacting said body adjacent said side.

2. A clutch cushion of the character described including, a body of rubber in the form of a flat sided block with a notch in one side, and a retaining spool carried by the body having a shank engaged in the notch in said side of the body and heads on the ends of the shank with portions thereof projecting from the body at said side and with other portions contacting the body adjacent said side thereof.

3. A clutch cushion of the character described including, a body of rubber in the form of a rectangular block, bearing plates engaging opposite ends of the body, and a retaining spool carried by the body at the exterior thereof and spaced from said plates, said spool having a shank engaging the body and heads on the ends of the shank with portions engaging the body and portions projecting from the body.

4. A clutch cushion of the character described including, an elongated block shaped body of rubber with a notch in one side, bearing plates engaging the ends of the body, and a retaining speel carried by the body at said side thereof and having a shank engaged in the notch in said side of the body and heads on the ends of the shank partially projecting from the body and partially overlying the body adjacent said side thereof.

5. A clutch cushion of the character described including, an elongated flat sided body of rubber, bearing plates at the ends of the body and bearing thereon, and a retaining spool carried by the body having a shank engaging one side of the body and heads on the ends of the shank projecting from the body and overlying opposite sides of the body adjacent the first mentioned side thereof, the bearing plates having ears overlying sides of the body.

6. A clutch cushion of the character described including, an elongated flat sided body of rubber with flat ends and a notch in one side, bearing plates seated on the ends of the body and extending substantially at right angles to the side in which said notch is located, and a retaining spool carried by the body at the notched side thereof and having a shank engaged in the notch in said side of the body and heads on the ends of the shank with portions overlying opposite sides of the body that are adjacent the notched side of the body and with portions projecting from the notched side of the body, each bearing plate having ears overlying the sides of the body engaged by the heads of the spool.

HENRY C. GOODCHILD.

REFERENCES CITED

The following references are of record in the file of this patent:

UNITED STATES PATENTS

| Number | Name | Date |
| --- | --- | --- |
| 1,541,883 | Wemp | June 16, 1925 |
| 1,609,448 | Wemp | Dec. 7, 1926 |
| 1,825,352 | Jansson | Sept. 29, 1931 |
| 1,862,991 | Vargha | June 14, 1932 |
| 1,993,260 | Burns | Mar. 5, 1935 |
| 2,221,463 | Wolfram | Nov. 12, 1940 |
| 2,305,814 | Schieferstein | Dec. 22, 1942 |
| 2,397,642 | Blazek | Apr. 2, 1946 |

FOREIGN PATENTS

| Number | Country | Date |
| --- | --- | --- |
| 532,394 | Great Britain | Dec. 20, 1939 |